A. G. J. RAPP.
SAND BEATER.
APPLICATION FILED JULY 14, 1916.

1,280,838.

Patented Oct. 8, 1918.
2 SHEETS—SHEET 1.

Witnesses.
Edward T. Wray.
Christina Deans.

Inventor.
Axel G. J. Rapp.
by Parker & Carter
Attorneys.

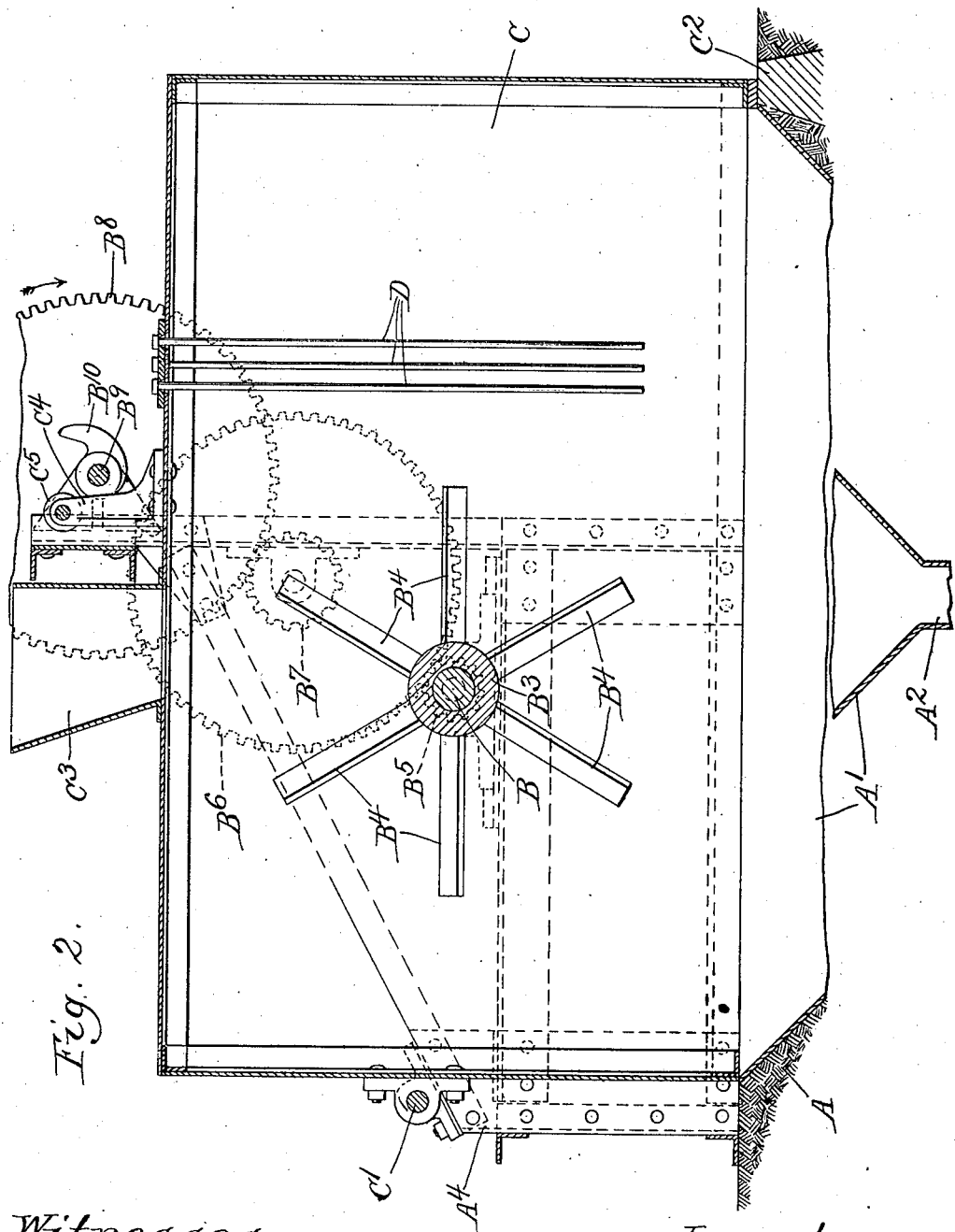

UNITED STATES PATENT OFFICE.

AXEL G. J. RAPP, OF CHICAGO, ILLINOIS, ASSIGNOR TO LINK-BELT COMPANY, OF CHICAGO, ILLINOIS, A CORPORATION OF ILLINOIS.

SAND-BEATER.

1,280,838.  Specification of Letters Patent.  Patented Oct. 8, 1918.

Application filed July 14, 1916. Serial No. 109,208.

*To all whom it may concern:*

Be it known that I, AXEL G. J. RAPP, a citizen of the United States, residing at Chicago, in the county of Cook and State of Illinois, have invented a certain new and useful Improvement in Sand-Beaters, of which the following is a specification.

My invention relates to improvements in a sand beater or sand mixer or machines which may be used for beating or mixing sand, coal, or any other granular or finely divided material.

My machine is expected to take the material in question, which may be finely divided or may be wet and adhesive. It is first beaten or broken, and the particles separated by a violent blow. This action drives it toward the side of the inclosure. A further separating effect or pulverizing or breaking up of the material is produced by a curtain of swinging rods. This curtain also reduces to a minimum the violent discharge of the material against the walls of the housing, which, when the material is adhesive, would result in accumulating masses of material on the housing walls. The material is also liable more or less to adhere to the curtain of rods and possibly to the beater itself.

Among the objects of my invention are therefore to break up such material by a series of violent blows delivered to the material as it falls through the beater zone; to further break it up or separate its particles and prevent their being thrown against the housing walls after they leave the beater, and then to continuously and automatically clear the walls, the interrupting curtain, and the beater, from adhering particles.

Other objects of the invention will appear from time to time in the specification.

My invention is illustrated more or less diagrammatically in the accompanying drawings, wherein—

Fig. 2 is a section along the line 2—2 of Fig. 1.

Like parts are indicated by like letters throughout the several figures.

Figure 1:
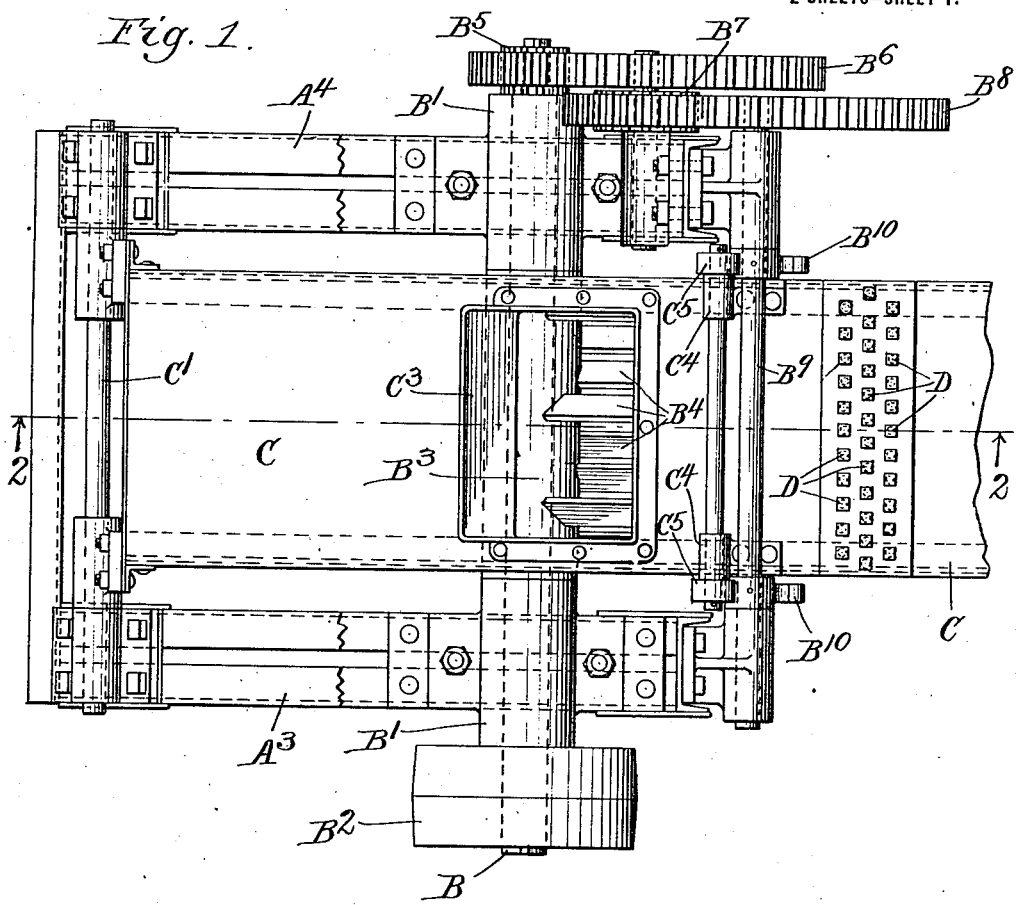
Figure 1 is a plan view.
Figure 3:
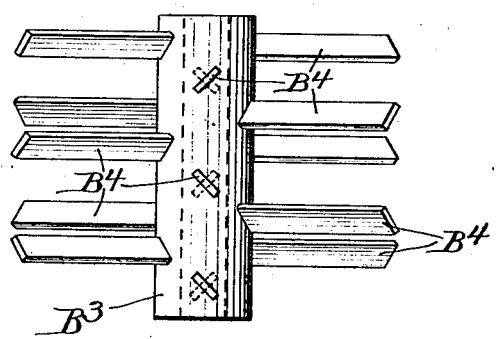
Fig. 3 is a detail showing the arrangement of the beating arm.

A is a foundation wall containing a hopper $A^1$, $A^2$ is a discharge chute leading therefrom, $A^3$, $A^4$ are parallel upwardly extending supporting frames, projecting upwardly from the foundation wall A.

B is a drive shaft rotatably mounted in the bearings $B^1$ in the frames $A^3$ $A^4$. It carries at one end a pulley $B^2$ whereby the shaft may be rotated by any suitable source of power not here shown. $B^3$ is a beater hub mounted on the shaft. Projecting outwardly from this beater hub are a series of beater arms $B^4$. These beater arms are arranged in two groups, the group on one side being inclined with respect to the group on the other side, and both groups being so arranged that material being struck by these beater arms when they are in a substantially vertical position and above the hub will be concentrated toward the center of the housing. That is to say, as the shaft rotates in a clockwise direction the front faces of the arms are inclined inwardly and rearwardly. $B^5$ is a pinion on the shaft B in mesh with a gear $B^6$, which is rotatably mounted on the frame $A^3$. $B^7$ is a pinion driven by the gear $B^6$, and it is in mesh with a gear $B^8$ which gear is mounted on a shaft $B^9$ rotatably mounted on the frames $A^3$, $A^4$. This shaft carries cams $B^{10}$.

C is a housing open at the bottom and closed on all four sides and at the top. It is pivoted at $C^1$ on the frames $A^3$, $A^4$. The housing is supported at its other end on a stop or anvil $C^2$ upon which it rests. $C^3$ is a supply hopper discharging into the housing immediately above the shaft B so that material fed to it may be struck by the beater arms. $C^4$ is a stirrup projecting upwardly from the housing C. It carries the rollers $C^5$ in the path of the cams $B^{10}$ so that as the cam rotates the roller will be raised, lifting the housing. As this cam further rotates the roller will drop off the end of the cam and the housing be allowed to drop down on the anvil $C^2$.

Rods D depend downwardly from the top of the housing in front of the shaft. The rods are arranged in three tiers or banks as indicated and swing freely. They extend down so far that all the material which is hit by the beater arms and projected forward strikes against them or passes through them so that they serve as a flexible curtain or interruption to arrest and deflect the material and to prevent too great a discharge of material against the end of the housing.

The curtain of rods through which way little of the material will pass, serves, of course, to break up and mix the material, but it also serves to interrupt and prevent any currents which might otherwise cause waste of material and which might prevent satisfactory mixing.

It will be evident that while I have shown in my drawings an operative device, still many changes might be made both in size, shape and arrangement of parts without departing materially from the spirit of my invention, and I wish therefore that my drawings be regarded as in a sense diagrammatic.

The use and operation of my device are as follows:

Material such as sand, dust, coal or the like which is to be broken up or mixed, is fed into the hopper at the top while the shaft is rotating rapidly. All the material as it comes in is struck by the beaters or paddles and projected forwardly against the curtain of bars. As soon as it strikes this curtain it drops down. Possibly other material may pass through the curtain and be projected against the side of the housing or against the back of the housing. Most of it, however, is stopped completely and drops through to the open bottom of the housing. That material which strikes the walls which is wet or sticky may stick upon them, or it may stick or adhere upon the bars. It is jarred loose, however, by the constant lifting up and dropping down of the housing, caused by the rotation of the cam on the lifting shaft. This cam rotates much less rapidly than does the shaft B, for instance, I prefer to rotate the shaft B at 800 revolutions a minute, and the cam shaft at possibly a tenth of that or possibly less. The cam operates to lift up the whole housing oscillating it through a small arc about a pivotal point and let it drop down upon the anvil. The sudden stoppage or jolt will jar loose the material and keep the surfaces always clean.

The inclination of the front of the working surface of the beater arms results in throwing the material from one side of the beater toward the opposite side of the housing. The result is that the different groups of material are thrown against the moving screen along converging lines, thus assisting in the intermixing and intermingling of the separate particles of material.

When the material is fed into the machine its path descends through the beating zone, and an inspection of Fig. 1 will show that in the preferred form of the machine the entire path of such material is traversed by blades of the beater. The net result is that all of the material or substantially all of it receives a blow from the rapidly rotating beater blades.

All such material is therefore violently propelled through the housing, and much, if not all of it, would strike the opposite wall of the housing, thus cutting it out and causing the adhesive particles to stick to the wall. These difficulties are obviated by interposing the permeable metallic curtain which I have here shown as a series of rods. These rods receive substantially all of the material and further separate its particles and prevent the greater part of it from passing through or to the opposite wall. The action of these curtain rods is improved by having them suspended so that they freely swing or have among themselves relative motion. They can also be easily replaced when worn or cut. By having the beater and the curtain one or both of them mounted in or on the housing, such mounted part is raised and lowered with the housing and receives a blow or shock when the housing drops upon the anvil. This tends to clear the housing and the beater or curtain or both as the case may be, from adhering particles.

Of course the structure whereby the housing is raised and lowered is only one way of giving to the parts the jar or shock which is necessary to produce this clearing effect.

By the use of the curtain among other things I obviate the necessity of having the housing made of great length.

I claim:

1. A sand beater comprising a housing open at the bottom and closed on the sides and top, a feed chute at the top and a beater contained therein, means for preventing the accumulation of material thrown by the beater upon the walls of the housing, said means comprising means for raising the housing and suddenly dropping it.

2. A sand beater comprising a housing open at the bottom and closed on the sides and top, a feed chute at the top, a beater contained therein, an anvil, the housing being pivoted and supported at one place by said anvil, means for raising the housing and then dropping it on the anvil.

3. A sand beater comprising a housing, an anvil block, the housing being pivotally supported at one side and resting on the anvil block at another, a rotatable beater contained within but out of contact with the housing, means for discharging material into the housing upon the beater, means for driving the beater, and means for raising the housing and dropping it upon the anvil, said means connected with and driven by the beater shaft.

4. A sand beater comprising a housing open at the bottom and closed on the sides and top, a feed chute at the top and a beater contained therein, means for preventing the accumulation of material thrown by the beater upon the walls of the housing, said means comprising means for raising the housing and suddenly dropping it, said beater being mounted independent of the housing.

5. A sand beater comprising a housing open at the bottom and closed on the sides and top, a feed chute at the top, a beater contained therein, an anvil, the housing being pivoted and supported at one place by said anvil, means for raising the housing and then dropping it on the anvil, said beater mounted independent of the housing.

6. A sand beater comprising a housing open at the bottom and closed on the sides and top, a feed chute at the top, a beater contained therein, an anvil, the housing being pivoted and supported at one place by said anvil, means for raising the housing and then dropping it on the anvil, said means comprising a cam driven in response to the rotation of the beater, said beater mounted independent of the housing.

7. A sand beater comprising a housing open at the bottom and closed on the sides and top, a feed chute at the top and a beater contained therein, means for preventing the accumulation of material thrown by the beater upon the walls of the housing, said means comprising means for raising the housing and suddenly dropping it, and a curtain of rods interposed between the beater and the housing wall and secured to so as to rise and fall with the housing.

8. A sand beater comprising a housing open at the bottom and closed on the sides and top, a feed chute at the top, a beater contained therein, an anvil, the housing being pivoted and supported at one place by said anvil, means for raising the housing and then dropping it on the anvil, and a curtain of rods interposed between the beater and the housing wall and secured to so as to rise and fall with the housing.

9. A sand beater comprising a housing open at the bottom and closed on the sides and top, a feed chute at the top, a beater contained therein, an anvil, the housing being pivoted and supported at one place by said anvil, means for raising the housing and then dropping it on the anvil, said means comprising a cam driven in response to the rotation of the beater, and a curtain of rods interposed between the beater and the housing wall and secured to so as to rise and fall with the housing.

10. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, and a permeable metallic curtain between the beater and the wall of the housing consisting of a series of swinging rods.

11. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, and a permeable metallic curtain between the beater and the wall of the housing consisting of a series of swinging staggered rods.

12. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, and a permeable metallic curtain between the beater and the wall of the housing, and means for automatically jarring said housing and curtain.

13. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, and a permeable metallic curtain between the beater and the wall of the housing consisting of a series of staggered rods, and means for automatically jarring said housing and curtain.

14. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, a permeable metallic curtain between the beater and the wall of the housing consisting of a series of swinging rods, and means for automatically jarring said housing and curtain.

15. The combination with a housing of means for feeding material thereto, a rotary beater mounted in the housing in the path of the material, means for driving said beater at a high rate of speed, said beater adapted to contact substantially all the material as it falls through the beater zone and to throw it violently through the housing, and a permeable metallic curtain between the beater and the wall of the housing consisting of a series of swinging staggered rods, and means for automatically jarring said housing and curtain.

16. A mixer for finely divided material comprising a housing, means for discharging the material thereinto and means located within the housing for projecting the material so discharged in a series of continuous streams along converging lines such that the particles in said streams impinge one upon another and a yielding flexible curtain located in the path of said particles the curtain being adapted to receive the particles after they have impinged one upon another.

17. The combination with a housing of means for feeding material thereto, a rotary beater mounted in the housing in the path of the material, means for driving said beater at a high rate of speed, said beater having beater arms projecting therefrom adapted to contact substantially all the material as it falls through the beater zone and to throw it violently through the housing along converging and interfering lines, the beating surfaces of said beater arms being set at varying angles to the path of the material.

18. The combination with a housing of means for feeding material thereto, a rotary beater mounted in the housing in the path of the material, means for driving said beater at a high rate of speed, said beater having beater arms projecting therefrom adapted to contact substantially all the material as it falls through the beater zone and to throw it violently through the housing along converging and interfering lines, the beating surfaces of said beater arms being set at varying angles to the path of the material, and a yielding permeable metallic curtain between the beater and the wall of the housing.

In testimony whereof, I affix my signature in the presence of two witnesses this 12th day of June 1916.

AXEL G. J. RAPP.

Witnesses:
MINNIE M. LINDENAU,
CHRISTINA DEANS.